US012755112B2

(12) United States Patent
Schütz

(10) Patent No.: US 12,755,112 B2
(45) Date of Patent: Oct. 6, 2026

(54) DETECTION APPARATUS FOR IDENTIFYING AN OBJECT TRANSPORTED BY A CONVEYING DEVICE

(71) Applicant: SICK AG, Waldkirch (DE)

(72) Inventor: Frank Schütz, Rheinhausen (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/656,883

(22) Filed: May 7, 2024

(65) Prior Publication Data

US 2024/0403576 A1 Dec. 5, 2024

(51) Int. Cl.
*G06K 7/02* (2006.01)
*G06K 7/10* (2006.01)

(52) U.S. Cl.
CPC ........... *G06K 7/02* (2013.01); *G06K 7/10297* (2013.01); *G06K 7/10445* (2013.01); *G06K 7/10732* (2013.01)

(58) Field of Classification Search
CPC .. G06K 7/02; G06K 7/10297; G06K 7/10445; G06K 7/10732; G10L 25/51; G06Q 10/08
See application file for complete search history.

(56) References Cited

U.S. PATENT DOCUMENTS 10,229,699 B2 * 3/2019 Jones .................. G06Q 10/087
2008/0136623 A1 6/2008 Calvarese
2017/0186124 A1 6/2017 Jones et al.

FOREIGN PATENT DOCUMENTS

EP 1247656 A1 10/2002

OTHER PUBLICATIONS

Search Report dated Nov. 22, 2023 issued in corresponding European Application No. 23175995.2.

* cited by examiner

*Primary Examiner* — Laura A Gudorf
(74) *Attorney, Agent, or Firm* — Nath, Goldberg & Meyer; Jerald L. Meyer

(57) ABSTRACT

The invention relates to a detection apparatus, in particular a code reader, comprising an identification unit for identifying an object transported by a conveying device, in particular a continuous conveyor, further in particular a roller conveyor, characterized in that the detection apparatus has at least a first microphone and is configured to detect the object acoustically, in particular during transport, by means of at least the first microphone, and to initiate an identification process of the object by means of the identification unit only when the object is detected.

30 Claims, 3 Drawing Sheets

DETECTION APPARATUS FOR IDENTIFYING AN OBJECT TRANSPORTED BY A CONVEYING DEVICE

FIELD

The invention relates to a detection apparatus, in particular a code reader, preferably a barcode scanner, comprising an identification unit for identifying an object transported by a conveying device, in particular a continuous conveyor, further in particular a roller conveyor, and to a method for identifying an object transported by a conveying device.

BACKGROUND

In factories or logistics centers, for example, it is important for a coordinated process that the location of an object, such as a package, is known. Usually, detection apparatus installed at conveying devices are used for this purpose that identify the object by means of an identification unit and, since the location of the detection apparatus is known, thus enable the object to be located.

In this respect, it is customary to only activate the identification unit when the object is also actually in the vicinity of the detection apparatus. A continuous operation of the identification unit, on the other hand, can unnecessarily reduce the service life of the detection apparatus, in particular in the case of laser-based identification units, since the risk of a defect, for example of a code reading sensor of the identification unit, increases.

Therefore, detection apparatus comprising light barriers are known that detect an approaching object by using a light barrier, wherein the identification unit is only activated in good time in the event of a detection in order to identify the object.

However, the disadvantage of this known solution for identifying the object is that a light barrier to be arranged separately must be provided for each detection apparatus, which also entails an additional installation effort for the detection apparatus, in particular for the light barrier and the identification unit per se, and for the additionally required cabling, and an additional maintenance effort of such a system.

SUMMARY

The invention is therefore based on the object of providing an apparatus for identifying an object transported by a conveying device, which apparatus has a simple design, wherein the disadvantages of the prior art do not occur.

This object is satisfied by a detection apparatus has at least a first microphone and is configured to detect the object acoustically, in particular during transport, preferably during a movement, in particular a noise-generating movement, during the transport, by means of at least the first microphone, and to initiate an identification process for identifying the object by means of the identification unit only when the object is detected.

Due to the acoustic detection by means of at least the first microphone, the detection apparatus according to the invention is configured to detect the presence of the object, in particular in a region in which the object can be identified by the identification unit, in good time without the need for a light barrier. The detection can in this respect take place in good time such that the identification process can be initiated and the object can be identified by the identification unit before the object moves away from the detection apparatus again due to the transport. The design of the detection apparatus and the installation and maintenance effort are hereby simplified. Since the detection apparatus is further configured to initiate an identification process of the object by means of the identification unit only when the object is detected, the service life of the detection apparatus can be increased and its energy consumption reduced.

The acoustic detection can, for example, be based on a sound generated by the object itself. However, the acoustic detection can also be based on a sound that is caused during a movement during the transport, for example a rolling sound of a roller conveyor. It is likewise conceivable that the acoustic detection is also based on a sound that is generated by another sound source and that is influenced by the object. The sound can, for example, be industrial noise in a factory hall that is shielded from the microphone by the object. Consequently, depending on the application, different sounds can be used for detection, wherein the decisive factor is that the sound is influenced by the object in a sufficiently characterizing manner so that the presence of the object is acoustically perceivable. In this regard, these and also other sounds that are associated with the detection of the object in the sense of the invention are generally referred to as a sound influenced by the object.

In this respect, "presence" in particular refers to the presence in a region in which the object can be identified by the identification unit.

Advantageous embodiments of the invention result from the dependent claims, from the description, and from the Figures.

Provision can be made that the identification unit comprises a code reading sensor for identifying the object. The identification unit can be configured for an operation in an inactive state, in which the code reading sensor is inactive and/or a measurement value output of the code reading sensor is not processed, and for an operation in an active state, in which the code reading sensor is active and/or the measurement value output of the code reading sensor is processed, wherein the detection apparatus is configured to transfer the identification unit from the inactive state to the active state when the object is detected. In the event of a detection, a reliable identification of the object can hereby take place. Since the code reading sensor is generally only active if the object was detected beforehand, the service life of the code reading sensor can be increased. In embodiments with a code reading sensor adapted for continuous operation, if only the measurement value output of the code reading sensor is not processed, the energy consumption can likewise be reduced due to the suspended processing and the service life of other components of the detection apparatus, such as a processor responsible for processing the code reading sensor data, can also be increased.

The identification unit is preferably configured to read out a code applied to the object, by means of which code the object can be identified, in particular by means of the code reading sensor, in particular in order to identify the object. Specific information can be easily associated with the object by means of the code. The reading out of the information by the identification unit thus enables a particularly simple and reliable identification of the object.

The code reading sensor is preferably configured as an optical sensor, in particular as a laser scanner, as a camera scanner and/or as an LED scanner. The code reading sensor can comprise a light source, for example a laser, by which the object is illuminated. The illumination preferably takes place linearly. Alternatively, the code reading sensor can also be configured as an electromagnetic sensor, in particular as an RFID reading device. Such sensors enable a particularly reliable identification of the object.

The detection apparatus advantageously comprises a second microphone at a defined spacing from the first microphone and is configured to detect the object acoustically, in particular during transport, preferably during a movement, in particular a noise-generating movement, during the transport, also by means of the second microphone. The first microphone and the second microphone can in this respect have the same/identical design. The detection of the object can be improved by means of the first microphone, the second microphone and the known defined spacing between them.

The detection apparatus is preferably configured to record and evaluate a volume and a pitch of a sound influenced by the object, in particular a transport sound of the object, by means of at least the first microphone, and in particular the second microphone, in particular in each case, in order to detect the object. The detection thus takes place based on two measurement variables, whereby the reliability of the detection is increased.

The detection apparatus can further be configured to calculate a distance between the object and the detection apparatus and/or a position of the object and/or a speed of the object and/or a direction of movement, in particular a transport direction, of the object by means of triangulation and/or beamforming on the basis of the volume and/or pitch recorded by the first microphone and the second microphone in each case. Furthermore, the detection apparatus can be configured to advantageously use the calculated distance to set an autofocus or a scanning frequency of the identification unit, in particular of the optical sensor, and/or to advantageously determine the speed of the conveying device via the calculated speed. The detection apparatus can further be configured to recognize a standstill of the conveying device by means of at least the first microphone. The detection apparatus can in particular comprise even further microphones in the form of a microphone array for detection, whereby the reliability of the detection, in particular by means of beamforming, can be increased even further. Due to the beamforming, sounds from an expected spatial region in which the presence of the object is to be detected can be amplified and sounds from other spatial regions can be dampened.

The detection apparatus can also be configured to recognize an irregularity in the operating sequence via the calculated distance between the object and the detection apparatus in order to provide extended diagnostic options. For example, an object transported along the margin of the conveying device can be recognized when passing the detection apparatus before the object falls off the conveying device, for example.

The detection apparatus is preferably configured to detect the object when the distance falls below a predetermined distance value and/or the object reaches a predefined position value. The function of a light barrier can in particular hereby be virtually implemented since the detection according to the invention can, for example, take place when reaching the predetermined distance value at which a light barrier is used in conventional systems.

The detection apparatus is preferably configured to detect the object when the volume exceeds a predefined first limit value and the pitch exceeds a predefined second limit value. A detection therefore generally only takes place if the respective limit value is simultaneously exceeded for both measurement variables. In this respect, it is not important that the limit values are simultaneously exceeded, but only that the two criteria are simultaneously satisfied. The reliability of the detection can hereby be further increased. If the detection apparatus is also configured to detect the object when a distance between the object and the detection apparatus falls below a predetermined distance value and/or the object reaches a predefined position value, the detection apparatus can be configured to apply this as an additional criterion in addition to exceeding the volume of the predefined first limit value and the pitch of the predefined second limit value, wherein the detection apparatus in such an embodiment can be configured so that a detection then only takes place if all the criteria are simultaneously satisfied. The reliability of the detection can hereby be increased even further.

The detection apparatus is advantageously configured to terminate the identification process after the identification of the object if the volume exceeds a predefined third limit value and the pitch exceeds a predefined fourth limit value, if a preset waiting time has elapsed after the identification, if a preset switch-off time has elapsed after the initiation of the identification process, if the distance exceeds a predetermined second distance value and/or if the object reaches a predefined second position value. The service life of the detection apparatus and its energy consumption can hereby be easily reduced.

The detection apparatus can further advantageously be configured to transfer the identification unit from the active state to the inactive state in order to terminate the identification process.

The limit values are preferably predefined such that the limit values have a correlation to one another, which correlation takes into account a relationship based on the Doppler effect between the volume and the pitch of the sound influenced by the object, in particular the transport sound of the object, when passing the detection apparatus. For example, the sound waves of the sound influenced by the object can be compressed in the direction of movement of the object when the object approaches the detection apparatus. As a result, when the object approaches the detection apparatus, the recorded volume can increase, wherein the recorded pitch can be higher than when the object is at the level of the detection apparatus. On the other hand, a sound that merely becomes louder and does not have the corresponding pitch could not lead to a detection. Since the recorded volume and pitch therefore generally only lead to a detection when they correspondingly correlate with the Doppler effect when the object approaches the detection apparatus, the reliability of the detection can be improved even further.

The detection apparatus can advantageously comprise a memory module on which the volume and pitch are recorded. Alternatively or additionally, the limit values, the waiting time, the switch-off time, the distance value, and in particular the second distance value, and/or the position value, and in particular the second position value, can be stored, in particular by the manufacturer, on the memory module. Further alternatively or additionally, the detection apparatus can be configured so that the limit values, the waiting time, the switch-off time, the distance value, and in particular the second distance value, and/or the position value, and in particular the second position value, are defined during an installation process of the detection apparatus. The memory module can in particular be configured for an electronic data exchange with an external device.

The respective required data can hereby be easily accessed, wherein the electronic data exchange also enables the data located on the memory module to be made available to another detection apparatus, for example.

The detection apparatus is preferably configured, during the installation process in which the object passes the detection apparatus at least once, to store, for each passing of the object, the volume of the sound influenced by the object as a, in particular respective, first reference pattern and the pitch of the sound influenced by the object as a, in particular respective, second reference pattern in the memory module by means of at least the first microphone, and in particular the second microphone, in particular in each case, and to determine the first limit value, and in particular the third limit value, via the at least one, in particular respective, first reference pattern and to determine the second limit value, and in particular the fourth limit value, via the at least one, in particular respective, second reference pattern. The limit values can hereby be particularly easily matched to the sound influenced by the object, whereby the reliability of the detection can be improved.

The detection apparatus is advantageously configured to compare the volume of the sound influenced by the object with the at least one, in particular respective, first reference pattern and the pitch of the sound influenced by the object with the at least one, in particular respective, second reference pattern and, depending on a match of the comparison, to detect the object and/or to terminate the identification process and/or to reject the identification. An identification can hereby, for example, be rejected again if the comparison reveals that the detection took place incorrectly, whereby the risk of an incorrect identification can be reduced. The degree actually required, i.e. for example the value of the match, in particular depends on the respective desired reliability of the detection and can be determined in a simple manner, for example experimentally.

The detection apparatus preferably has a hardware interface and is configured to output the identification via the hardware interface, in particular to an industrial system for further processing the identification, preferably for locating the identified object via the known location of the detection apparatus. The identification can thereby be output and processed further in a simple manner.

Advantageously, the detection apparatus has a housing, in which housing the identification unit and at least the first microphone, and in particular the second microphone and/or the memory module, are arranged. This results in a particularly compact and simple design of the detection apparatus, wherein, furthermore, the installation effort is also reduced.

The detection apparatus is advantageously configured to filter out the volume and pitch of a sound influenced by the object, in particular before a further evaluation, by means of one or more filters from an environmental sound of the detection apparatus, in particular industrial noise. In particular filters matched to the respective reference pattern can be provided for this purpose.

Furthermore, the detection apparatus can be configured to acoustically recognize unscheduled states of a system surrounding the detection apparatus by means of at least the first microphone, for example via a sounding of a warning siren of the conveying device, and to temporally correlate the recognized unscheduled state with a standstill of the conveying device recognized by means of at least the first microphone. The detection apparatus can thereby enable a transparent fault analysis.

The invention further relates to a method for identifying an object transported by a conveying device, in particular a continuous conveyor, further in particular a roller conveyor, in particular by means of a detection apparatus according to the preceding embodiments, wherein the object is detected acoustically, in particular during transport, and an identification process for identifying the object is only initiated when the object is detected.

The statements on the detection apparatus according to the invention generally apply to the method according to the invention; this in particular applies with respect to embodiments and advantages. It is furthermore understood that all the features mentioned herein can be combined with one another, unless explicitly stated otherwise.

BRIEF DESCRIPTION OF THE DRAWINGS

The invention will be described in the following by way of example with reference to the Figures. There are shown schematically FIG. 1 a detection apparatus known from the prior art.

DETAILED DESCRIPTION

Figure 1:
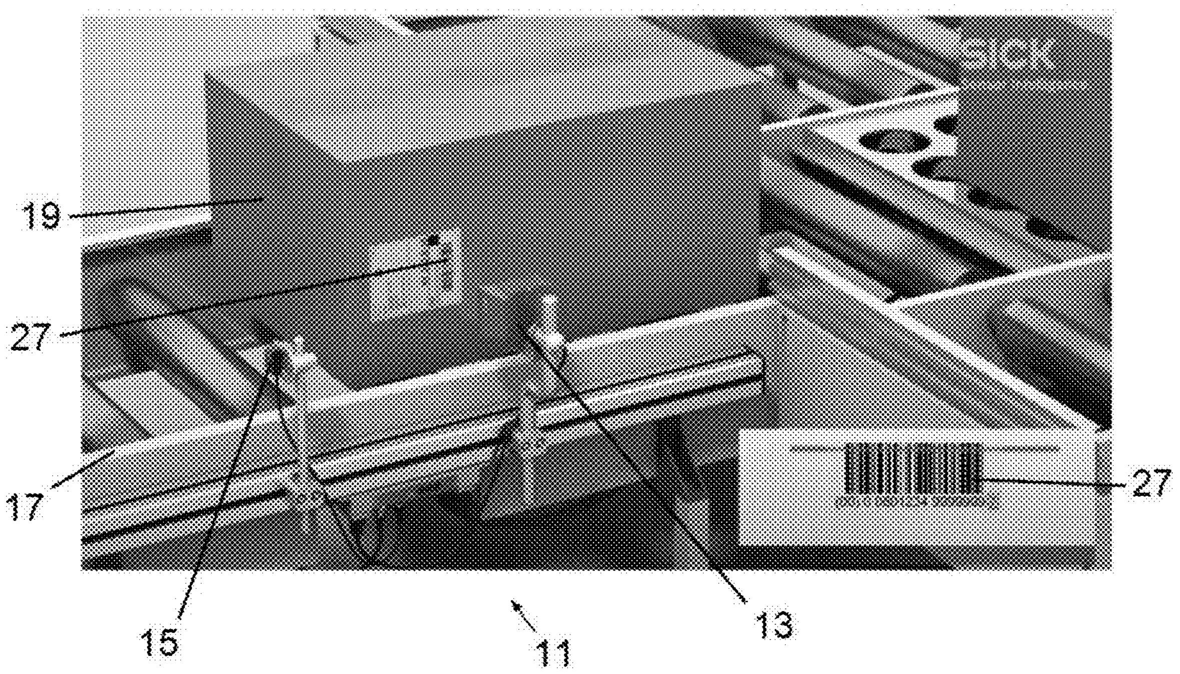

FIG. 1 shows a detection apparatus 11 known from the prior art comprising an identification unit 13 installed at a conveying device 17. The identification unit 13 is configured to identify an object 19 transported by the conveying device 17 during the transport. For this purpose, the object 19 is provided with a barcode 27 by means of which specific information can be easily associated with the object 19. An enlarged view of the barcode 27 is additionally shown at the bottom right in FIG. 1. The identification unit 13 is configured to read out the barcode 27 so that the object 19 can be identified via the barcode 27. In order not to reduce the service life of the detection apparatus 11 unnecessarily, the identification unit 13 is only activated when the object 19 is also actually in the vicinity of the detection apparatus 11. For this purpose, the detection apparatus 11 comprises, at a sufficiently large distance from the identification unit 13, a light barrier 15 by means of which the detection apparatus 11 can detect the approaching object 19 and only activates the identification unit 13 in good time in the event of a detection so that the identification unit 13 can identify the object 19 by reading out the barcode 27 before the object 19 has passed the detection apparatus 11.

However, a disadvantage of this known solution for identifying the object 19 is that a light barrier 15 must be provided for each detection apparatus 11, which also entails an additional installation effort for the detection apparatus 11, in particular for the light barrier 15 and the identification unit 13 per se, and for the additionally required cabling, and an additional maintenance effort of such a detection apparatus 11.

Figure 2:
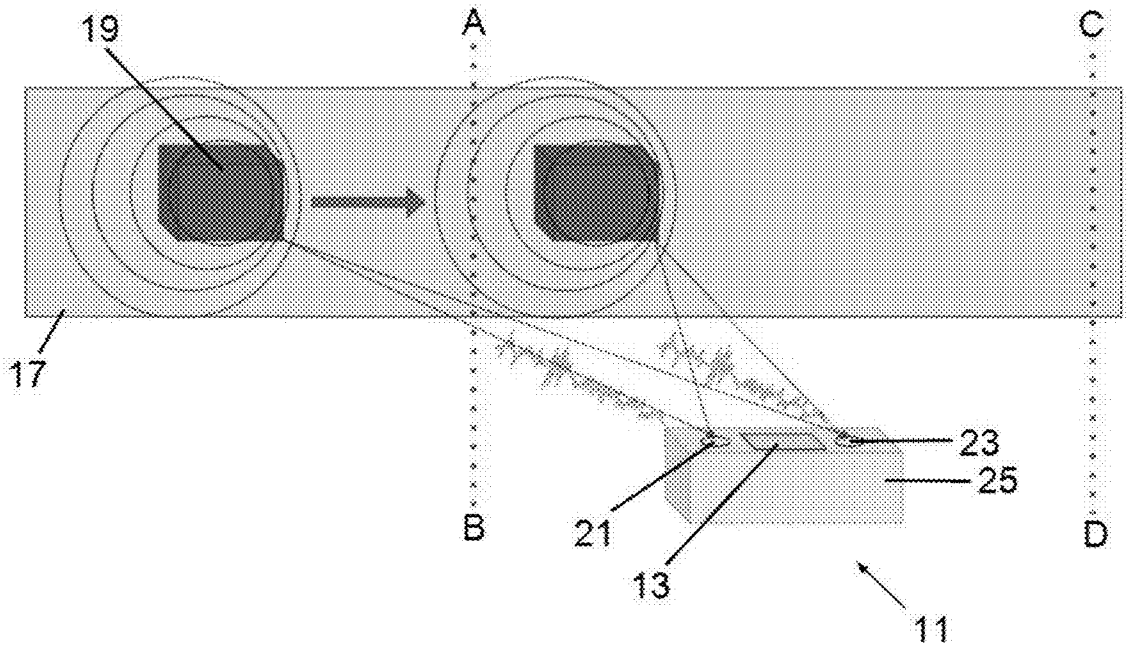
FIG. 2 a detection apparatus according to the invention.

FIG. 2 shows a detection apparatus 11 according to the invention in the form of a stationary barcode scanner. The detection apparatus 11 is laterally arranged at a conveying device 17 that transports an object 19 in the form of a package in the direction illustrated by the arrow. The detection apparatus 11 comprises an identification unit 13 for identifying the object 19 transported by the conveying device 17 and a first microphone 21. The detection apparatus 11 is configured to detect the object 19 acoustically during a sound-generating movement during the transport by means of at least the first microphone 21, and to initiate an identification process for identifying the object 19 by means of the identification unit 13 only when the object 19 is detected.

The identification unit 13 comprises a code reading sensor (not shown) in the form of a laser scanner for identifying the object 19. The identification unit 13 is configured for an operation in an inactive state, in which the code reading sensor is inactive, and for an operation in an active state, in which the code reading sensor is active. The detection apparatus 11 is configured to transfer the identification unit 13 from the inactive state to the active state when the object 19 is detected. For this purpose, the detection apparatus 11 comprises a control device, not shown. Furthermore, the identification unit 13 is configured to read out a code (not shown) applied to the object 19, by means of which code the object 19 can be identified, by means of the code reading sensor in order to identify the object 19.

Furthermore, the detection apparatus 11 has a second microphone 23 at a defined spacing from the first microphone 21 and is configured to detect the object 19 acoustically during a sound-generating movement during the transport, also by means of the second microphone 23. The first microphone 21 and the second microphone 23 can have the same design in this respect.

The detection apparatus 11 is configured to record and evaluate a volume and a pitch of a sound influenced by the object 19 by means of the first microphone 21 and the second microphone 23 in each case in order to detect the object 19. In the embodiment example shown in FIG. 2, the sound influenced by the object 19 is a transport sound of the object 19 that is illustrated by the circles drawn around the object 19.

Furthermore, the detection apparatus 11 is configured to calculate, via the volume in each case recorded by the first microphone 21 and the second microphone 23, a distance between the object 19 and the detection apparatus 11 by means of triangulation on the basis of the transit time differences to the first microphone 21 and the second microphone 23, the speed of sound and the known defined spacing between the first microphone 21 and the second microphone 23.

Figure 3:
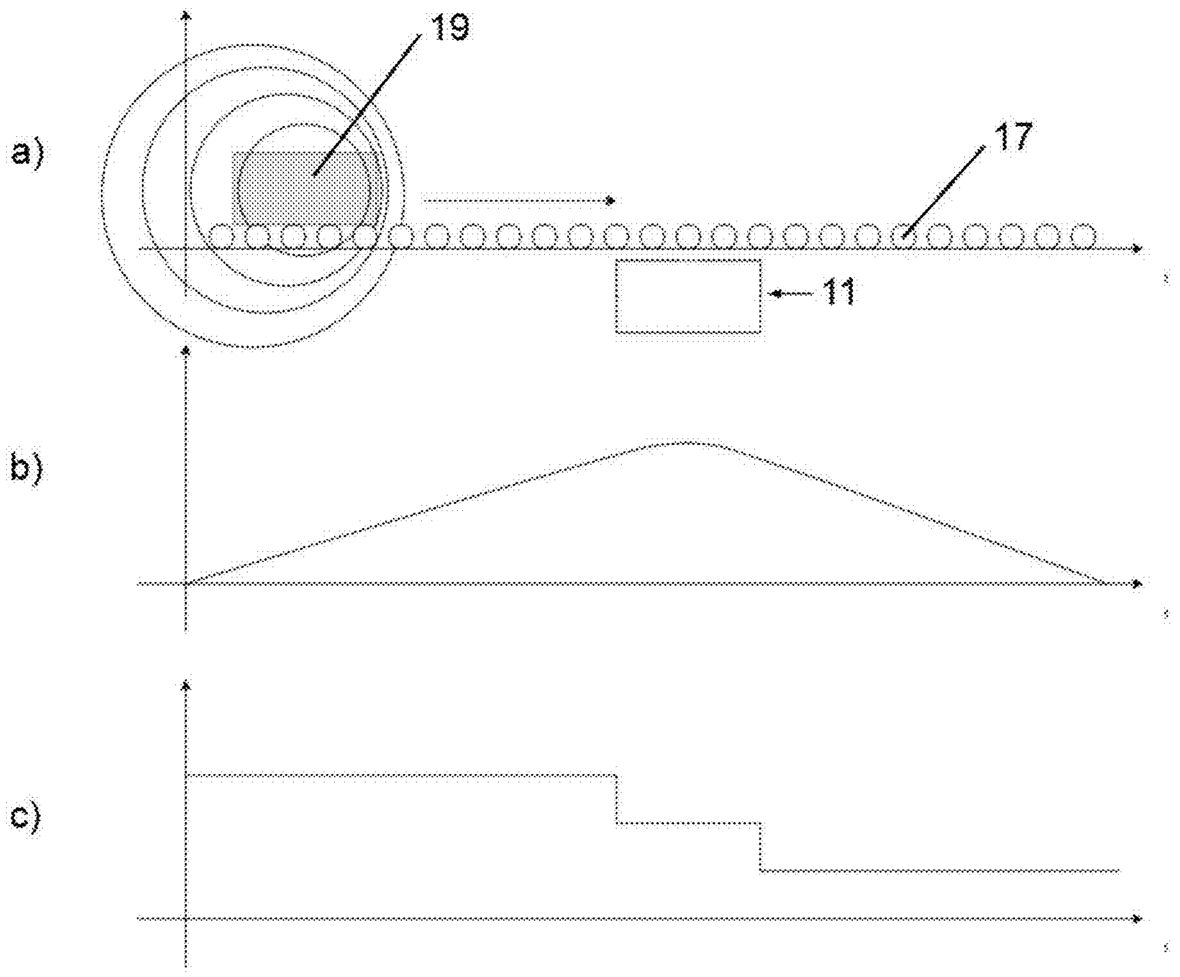
FIG. 3 a time development of volume and pitch at the location of the detection apparatus during the transport of the object.

In FIG. 3, a time development of the volume (b)) and the pitch (c)) are shown by way of example for the embodiment example shown in FIG. 2 as they are recorded by one of the microphones 21, 23 at the location of the detection apparatus 11 when the object 19 passes the detection apparatus 11 (*a*)) transported by the conveying device 17 as illustrated by the arrow. The passing comprises the object 19 approaching the detection apparatus 11, being at its level and moving away from it again. If the object 19 approaches the detection apparatus 11, the volume increases, wherein the pitch—since the sound waves of the sound influenced by the object 19 are compressed in the direction of movement of the object 19 in the embodiment example shown—is higher than when the object 19 is at the level of the detection apparatus 11. If the object 19 is at the level of the detection apparatus 11, the volume reaches a maximum, but the pitch is lower than during the approach. If the object 19 moves away from the detection apparatus 11 again, the volume decreases, wherein the pitch—since the sound waves of the sound influenced by the object 19 are stretched against the direction of movement of the object 19 in the embodiment example shown—is lower than when the object 19 is at the level of the detection apparatus 11.

For a particularly reliable detection of the object 19, the detection apparatus 11 of the embodiment example shown is configured to detect the object only if the following three criteria are simultaneously satisfied:

If a predefined first limit value of the volume and a predefined second limit value of the pitch are simultaneously exceeded, a corresponding first criterion and a corresponding second criterion for detecting the object 19 are simultaneously satisfied. In this respect, it is not important that the limit values are actually simultaneously exceeded, but only that both criteria are simultaneously satisfied. In this embodiment example, the first limit value and the second limit value are predefined such that the two limit values have a correlation to one another, which correlation takes into account a relationship based on the Doppler effect between the volume and the pitch of the sound influenced by the object 19 when approaching the detection apparatus 11 in accordance with the illustration from FIG. 3. If the calculated distance simultaneously falls below a predetermined distance value, a corresponding third criterion is simultaneously satisfied.

In a first situation in FIG. 2, the object 19 is still too far away from the detection apparatus 11 for the detection since the first limit value and the second limit value are predefined such that and the distance value is predetermined such that, due to the sound influenced by the object 19 when approaching the detection apparatus 11, the corresponding above criteria are only simultaneously satisfied when the object 19 reaches the position illustrated by the line AB. The detection in this position activates the identification unit 13 in good time so that it can identify the object 19 before the object 19 has passed the detection apparatus 11.

In a second situation in FIG. 2, the object 19 has reached a position in which the above criteria are simultaneously satisfied, whereby the detection of the object 19 took place. Thus, in the second situation, the identification unit 13 is transferred to the active state and is ready to read out the code applied to the object 19 by means of the code reading sensor. In this embodiment example, this happens when the object 19 is at the level of the detection apparatus 11.

Furthermore, if the volume falls below a predefined third limit value and the pitch falls below a predefined fourth limit value, the detection apparatus 11 is configured to terminate the identification process by means of the control device and to transfer the identification unit 13 from the active state to the inactive state.

However, this only happens when the object 19 reaches the position illustrated by the line CD since the third limit value and the fourth limit value are predefined such that, due to the sound influenced by the object 19 when moving away from the detection apparatus 11, the third limit value and the fourth limit value are only simultaneously fallen below from the position CD. For example, the first and third as well as the second and fourth limit values can be identical limit values.

The detection apparatus 11 furthermore comprises a memory module (not shown) on which the volume and the pitch are recorded, wherein the detection apparatus 11 is configured such that the limit values and the distance value are defined during an installation process of the detection apparatus 11. For this purpose, the detection apparatus 11 is configured, during the installation process in which the object 19 passes the detection apparatus 11 at least once, to store, for each passing of the object 19, the volume of the sound influenced by the object 19 as a respective first reference pattern and the pitch of the sound influenced by the object 19 as a respective second reference pattern in the memory module by means of the first microphone 21 and the second microphone 23 in each case, and to determine the first limit value and the third limit value via the at least one respective first reference pattern and to determine the second limit value and the fourth limit value via the at least one respective second reference pattern. During the installation process of the embodiment example shown in FIG. 2, the object 19 passed the detection apparatus three times to define the limit values. The distance value was entered manually by an operator of the detection apparatus 11 in coordination with the first and second limit values defined in this way and is thus defined by the detection apparatus 11.

Furthermore, the detection apparatus 11 is configured to compare the volume of the sound influenced by the object 19 with the three respective first reference patterns and the pitch of the sound influenced by the object 19 with the three respective second reference patterns and to reject the identification depending on a match of the comparison. An identification can hereby, for example, be rejected again if the comparison reveals that the detection took place incorrectly, whereby the risk of an incorrect identification can be reduced.

The detection apparatus 11 furthermore has a hardware interface (not shown) and is configured to output the identification via the hardware interface to an industrial system for locating the identified object 19 via the known location of the detection apparatus 11. Furthermore, the detection apparatus 11 comprises a housing 25, in which housing 25 the identification unit 13, the first microphone 21, the second microphone 23, the memory module and the hardware interface are arranged. This results in a particularly compact and simple design of the detection apparatus 11, wherein, furthermore, the installation effort is also reduced.

REFERENCE NUMERAL LIST

11 detection apparatus
13 identification unit
15 light barrier
17 conveying device
19 object
21 first microphone
23 second microphone
25 housing

The invention claimed is:

1. A detection apparatus, comprising an identification unit for identifying an object transported by a conveying device,
wherein the detection apparatus has at least a first microphone and is configured to detect the object acoustically, in particular during transport, by means of at least the first microphone, and to initiate an identification process of the object by means of the identification unit only when the object is detected,
and wherein the detection apparatus is configured to detect the object when a detected volume exceeds a predefined first limit value and a detected pitch exceeds a predefined second limit value.

2. The detection apparatus according to claim 1, that is a code reader.

3. The detection apparatus according to claim 1, wherein the conveying device is a continuous conveyor.

4. The detection apparatus according to claim 3, wherein the continuous conveyor is a roller conveyor.

5. The detection apparatus according to claim 1,
wherein the detection apparatus is configured to detect the object acoustically during transport.

6. The detection apparatus according to claim 1, wherein the identification unit comprises a code reading sensor for identifying the object and is configured for an operation in an inactive state, in which the code reading sensor is inactive and/or a measurement value output of the code reading sensor is not processed, and for an operation in an active state, in which the code reading sensor is active and/or the measurement value output of the code reading sensor is processed, and wherein the detection apparatus is configured to transfer the identification unit from the inactive state to the active state when the object is detected.

7. The detection apparatus according to claim 6, wherein the code reading sensor is designed as an optical sensor or wherein the code reading sensor is designed as an electromagnetic sensor.

8. The detection apparatus according to claim 7, wherein the code reading sensor is at least one of a laser scanner, a camera scanner and a light emitting diode (LED) scanner or a radio frequency identification (RFID) reading device.

9. The detection apparatus according to claim 1, wherein the identification unit is configured to read out a code applied to the object, by means of which code the object can be identified.

10. The detection apparatus according to claim 9, wherein the identification unit is configured to read out the code applied to the object by means of a code reading sensor.

11. The detection apparatus according to claim 1, wherein the detection apparatus has a second microphone at a defined spacing from the first microphone and is configured to detect the object acoustically by means of the second microphone.

12. The detection apparatus according to claim 11, wherein the detection apparatus is configured to detect the object acoustically during transport.

13. The detection apparatus according to claim 1, wherein the detection apparatus is configured to record and evaluate a volume and a pitch of a sound influenced by the object by means of at least the first microphone in order to detect the object.

14. The detection apparatus according to claim 13, wherein the sound is a transport sound of the object.

15. The detection apparatus according to claim 13, wherein the detection apparatus is further configured to record and evaluate the volume and the pitch of the sound influenced by the object by means of the first microphone and a second microphone in order to detect the object.

16. The detection apparatus according to claim 13, wherein the detection apparatus is further configured to record and evaluate the volume and the pitch of the sound influenced by the object by means of the first microphone and a second microphone in each case in order to detect the object.

17. The detection apparatus according to claim 13, wherein the detection apparatus comprises a memory module on which memory module the volume and the pitch are recorded and/or the limit values, a waiting time, a switch-off time, a distance value, and in particular a second distance value, and/or a position value, and/or wherein the detection apparatus is configured so that the limit values, a waiting time, a switch-off time, a distance value, and/or a position value are defined during an installation process of the detection apparatus.

18. The detection apparatus according to claim 17, wherein the memory module is configured for an electronic data exchange with an external device.

19. The detection apparatus according to claim 17,
wherein the detection apparatus is configured, during the installation process in which the object passes the detection apparatus at least once, to store, for each passing of the object, the volume of the sound influenced by the object as a first reference pattern and the pitch of the sound influenced by the object as a second reference pattern in the memory module by means of at least the first microphone, and to determine the first limit value via the first reference pattern and to determine the second limit value via the second reference pattern.

20. The detection apparatus according to claim 19, wherein the detection apparatus is configured to compare the volume of the sound influenced by the object with the at least one first reference pattern and the pitch of the sound influenced by the object with the at least one second reference pattern and, depending on a match of the comparison, to detect the object, to terminate the identification process and/or to reject an identification.

21. The detection apparatus according to claim 13, wherein the detection apparatus is configured to calculate a distance between the object and the detection apparatus and/or a position of the object and/or a speed of the object by means of triangulation on the basis of the volume and/or pitch recorded by the first microphone and a second microphone in each case.

22. The detection apparatus according to claim 21, wherein the detection apparatus is configured to detect the object when the distance falls below a predetermined distance value and/or the object reaches a predefined position value.

23. The detection apparatus according to claim 21, wherein the limit values are predefined such that the limit values have a correlation to one another, which correlation takes into account a relationship based on the Doppler effect between the volume and the pitch of the sound influenced by the object when passing the detection apparatus.

24. The detection apparatus according to claim 21, wherein limit values are predefined such that the limit values have a correlation to one another, which correlation takes into account a relationship based on the Doppler effect between the volume and the pitch of the sound influenced by the object when passing the detection apparatus.

25. The detection apparatus according to claim 1, wherein the detection apparatus is configured to terminate the identification process after an identification of the object if the volume exceeds a predefined third limit value and the pitch exceeds a predefined fourth limit value, if a preset waiting time has elapsed after the identification, if a preset switch-off time has elapsed after the initiation of the identification process, if a distance exceeds a predetermined second distance value and/or if the object reaches a predefined second position value.

26. The detection apparatus according to claim 25, wherein the detection apparatus is configured to transfer the identification unit from an active state to an inactive state in order to terminate the identification process.

27. The detection apparatus according to claim 25, wherein the sound influenced by the object is a transport sound.

28. The detection apparatus according to claim 1, wherein the detection apparatus has a housing, in which housing the identification unit and at least the first microphone and/or a memory module, are arranged.

29. A detection apparatus, comprising an identification unit for identifying an object transported by a conveying device, wherein the detection apparatus has at least a first microphone and is configured to detect the object acoustically, in particular during transport, by means of at least the first microphone, and to initiate an identification process of the object by means of the identification unit only when the object is detected, wherein the detection apparatus is configured to record and evaluate a volume and a pitch of a sound influenced by the object by means of at least the first microphone in order to detect the object, and wherein limit values are predefined such that the limit values have a correlation to one another, which correlation takes into account a relationship based on the Doppler effect between the volume and the pitch of the sound influenced by the object when passing the detection apparatus.

30. A detection apparatus, comprising an identification unit for identifying an object transported by a conveying device, wherein the detection apparatus has at least a first microphone and is configured to detect the object acoustically, in particular during transport, by means of at least the first microphone, and to initiate an identification process of the object by means of the identification unit only when the object is detected, wherein the detection apparatus is configured to record and evaluate a volume and a pitch of a sound influenced by the object by means of at least the first microphone in order to detect the object, wherein the detection apparatus comprises a memory module on which memory module the volume and the pitch are recorded and/or limit values, a waiting time, a switch-off time, a distance value, and a second distance value, and/or a position value, and/or wherein the detection apparatus is configured so that the limit values, a waiting time, a switch-off time, a distance value, and/or a position value are defined during an installation process of the detection apparatus, and wherein the detection apparatus is configured, during the installation process in which the object passes the detection apparatus at least once, to store, for each passing of the object, the volume of the sound influenced by the object as a first reference pattern and the pitch of the sound influenced by the object as a second reference pattern in the memory module by means of at least the first microphone, and to determine the first limit value via the first reference pattern and to determine the second limit value via the second reference pattern.

* * * * *